(12) United States Patent
Itoh et al.

(10) Patent No.: US 7,149,608 B2
(45) Date of Patent: Dec. 12, 2006

(54) INFORMATION PROVIDING DEVICE FOR VEHICLE

(75) Inventors: Kazutomo Itoh, Kanagawa (JP); Hisashi Chiba, Kanagawa (JP); Masashi Gotoh, Kanagawa (JP); Tohru Okada, Kanagawa (JP)

(73) Assignee: Suzuki Motor Corporation, Shizuoka (JP)

( * ) Notice: Subject to any disclaimer, the term of this patent is extended or adjusted under 35 U.S.C. 154(b) by 144 days.

(21) Appl. No.: 10/870,952

(22) Filed: Jun. 21, 2004

(65) Prior Publication Data

US 2005/0001715 A1    Jan. 6, 2005

(30) Foreign Application Priority Data

Jul. 4, 2003    (JP)    ............................. 2003-270871

(51) Int. Cl.
 *G06F 17/00* (2006.01)
(52) U.S. Cl. ........................................................ 701/1
(58) Field of Classification Search ................... 701/1
See application file for complete search history.

(56) References Cited

U.S. PATENT DOCUMENTS 5,617,085 A * 4/1997 Tsutsumi et al. ........... 340/903
2003/0088361 A1 * 5/2003 Sekiguchi ................... 701/301

2004/0090314 A1    5/2004 Iwamoto

FOREIGN PATENT DOCUMENTS

JP    02-241855    9/1990
JP    03-085069    4/1991

OTHER PUBLICATIONS

English language Abstract of JP 03-085069.
English language Abstract of JP 02-241855.

* cited by examiner

*Primary Examiner*—Thu V. Nguyen
(74) *Attorney, Agent, or Firm*—Greenblum & Bernstein, P.L.C.

(57) ABSTRACT

An image obtainer, a distance detector, a computer, and an information provider are provided to a vehicle. The computer has a caution-determination function to determine whether caution is required with respect to objects existing around the vehicle by arithmetically processing image data and distance data, and an information providing function to output an instruction to provide information to the occupants of the vehicle by the information provider when it is determined that caution is required. A reference axis for obtaining image is positioned at the center of a range of obtaining the image data by the image obtainer, and a reference axis for detecting distance is positioned at the center of a range of detecting the distance data by the distance detector. The image obtainer and the distance detector are arranged such that the reference axes are coaxially aligned.

7 Claims, 8 Drawing Sheets

INFORMATION PROVIDING DEVICE FOR VEHICLE

FIELD OF THE INVENTION

1. Technical Field

The present invention relates to an information providing device for a vehicle, in particular, to an information providing device which determines whether caution should be taken with respect to objects around the vehicle using image data and distance data around the vehicle, and when caution is required, provides information to the occupants of the vehicle.

2. Related Art

Conventionally, alarming devices for vehicles have been developed, which devices recognize surrounding situations of vehicles by using image data obtained through cameras and distance data detected by distance sensors, and when it is determined, through arithmetic processing of the data, that caution is required with respect to other traveling vehicles or other obstacles, alarms are generated in the vehicle.

For example, Japanese Patent Application Laid-open No. 3-85069 and Japanese Patent Application Laid-open No. 2-241855 disclose devices which include cameras and distance sensors and recognize surrounding situations. A device disclosed specifically in the Japanese Patent Application Laid-open No. 3-85069 is the one in which distance data and image data are combined to thereby indicate on a monitor in the vehicle the situation of the area behind the vehicle. A device disclosed in the Japanese Patent Application Laid-open No. 2-241855 first calculates the optical flow from image data obtained by a camera, and based on the optical flow calculated, recognizes that a vehicle is approaching. Then, the device detects the relative speed of the approaching vehicle using data obtained from a distance sensor. Based on this, information is provided to the occupants if caution is required against the vehicle.

However, the devices of the conventional examples described above have such disadvantages as described below. That is, when a camera and a distance sensor are used at the same time, image data and distance data, which are data obtained by the camera and the distance sensor, involve a problem of coincidence accuracy. More specifically, there may be a case where an object existing around the vehicle is recognized by mistake as an object against which caution should be taken, which is caused by a gap between the obtaining range of the camera and that of the distance sensor. Thus, there may be a case where unnecessary information is provided in the vehicle, causing a problem of annoyance to the occupants.

SUMMARY OF THE INVENTION

Therefore, it is desirable as an information providing device for vehicle to accurately recognize whether caution is required against objects around the vehicle, and to provide necessary information only.

Thus, the present invention comprises: an image obtaining means for obtaining image data around a vehicle; a distance detecting means for detecting distance data to an object existing around the vehicle; a computer which controls an operation to obtain the image data by the image obtaining means and an operation to obtain the distance data by the distance detecting means, and performs arithmetic processing of the image data and the distance data; and an information providing means for providing to the occupants of the vehicle information related to an object around the vehicle, all of which are provided to the vehicle. The computer has: a caution-requirement determining function to determine, by performing the arithmetic processing of the image data and the distance data, whether caution is required against an object existing around the vehicle; and an information providing function to output an instruction so as to provide information by the information providing means to the occupants of the vehicle if it is determined that caution is required. Further, a reference axis for obtaining images is so set as to be located at the center of a range for obtaining image data by the image obtaining means, while a reference axis for detecting distances is so set as to be located at the center of a range for detecting distance data by the distance detecting means, and the image obtaining means and the distance detecting means are arranged in such a manner that the reference axis for obtaining an image and the reference axis for detecting a distance are positioned coaxially.

It is desirable to have such a structure that the computer has an area dividing function to divide the image data obtained by the image obtaining means and the distance data detected by the distance detecting means into a plurality of areas, respectively, and to set divided areas to correspond with each other, and the caution-requirement determining function has a function of performing processing to data in a predetermined divided area.

It is more desirable to have such a structure that the caution-requirement determining function includes a function of determining, using the distance data divided, whether an object exists within a range of a predetermined distance from the vehicle, and determining whether an object against which caution is required exists in a divided area of the image data corresponding to an area where the object exists within the range of the predetermined distance.

The preset invention may have such a structure that the caution-requirement determining function includes a function of determining, using the image data divided, whether an object approaching the vehicle exists, and determining whether an object against which caution is required exists in a divided area of the distance data corresponding to an area where the approaching object exists.

It is desirable to have such a structure that the computer has: an area dividing function to divide the image data obtained by the image obtaining means and the distance data detected by the distance detecting means into a plurality of areas, respectively, and to set divided areas to correspond with each other; and a divided data loading function to control the operations of the image obtaining means and the distance detecting means so as to be capable of obtaining the image data and the distance data for each of the divided areas, and to set divided areas to correspond with each other, and the caution-requirement determining function includes a function of performing processing to data in a predetermined divided area.

In the structure described above, it is more desirable to have such a structure that the caution-requirement determining function includes: a load area specifying function to determine, using the distance data, whether an object exists within a range of a predetermined distance from the vehicle, and if an object exists within the range of the predetermined distance, to specify a divided area on the image data corresponding to a divided area on the distance data where the object exists and to notify the divided data loading function; and a function of determining, using data of the specified divided area obtained by the divided data loading function, whether an object against which caution is required exists, and the divided data loading function includes a function of obtaining by the image obtaining means the image data of the divided area specified, based on a notification from the load area specifying function.

Alternatively, the present invention may have such a structure that the caution-requirement determining function includes: a load area specifying function to determine, using the image data, whether an object approaching the vehicle exists, and if the approaching object exists, to specify a divided area on the distance data corresponding to a divided area on the image data where the object exists, and to notify the divided data loading function; and a function of determining, using the image data of the specified divided area obtained by the divided data loading function, whether an object against which caution is required exists, and the divided data loading function includes a function of detecting by the image obtaining means the image data of the divided area specified, based on a notification from the load area specifying function.

EFFECTS OF THE INVENTION

With the structure described above, the image obtaining means and the distance detecting means, aligned coaxially, detect image data and distance data around the vehicle, whereby the detection ranges of both detected data coincide with each other with high accuracy. Therefore, the result of a determination of whether caution is required against objects around the vehicle, performed based on such data, can be obtained with high accuracy. Thereby, it is possible to provide more reliable information.

Further, for both of the image data and the distance data, it is determined whether objects against which caution is required exist in a predetermined area where both data correspond with each other. Thereby, the processing range is limited, so that the processing burden can be reduced. In particular, the processing burden can be further reduced by determining whether objects exist within a range of a predetermined distance using distance data, and if exist, determining whether the objects against which caution is required exist, using the image data of the corresponding area. In contrast, it is also possible to reduce the processing burden as same as described above in such a manner as to determine using image data whether approaching objects exist, and if exist, to determine using distance data of the corresponding area whether objects against which caution is required exist. Here, if the device is so configured as to obtain data of only a divided area for which processing is performed, the burden on the computer in data obtaining can be further reduced.

BRIEF DESCRIPTION OF THE DRAWINGS

FIGS. 2A and 2B are explanatory illustrations about a state of mounting an image obtaining means and a distance detection means, wherein FIG. 2A is an illustration showing an example of mounting positions of the image obtaining means and the distance detection means on the vehicle, and FIG. 2B is an illustration showing a measuring range of each data by the image obtaining means and the distance detecting means;

FIGS. 3A, 3B and 3C are explanatory illustrations showing mounting positions of the image obtaining means and the distance detection means, wherein FIG. 3A is an illustration showing a position of mounting the distance detection means, FIG. 3B is an illustration showing a position of mounting the image obtaining means, and FIG. 3C is an illustration where the distance detection means and the image obtaining means are mounted at the same time;

FIGS. 4A and 4B are explanatory charts showing divided states of obtained data, wherein FIG. 4A shows image data and FIG. 4B shows distance data;

FIGS. 6A and 6B are explanatory illustrations showing a state of optical flow calculation processing, wherein FIG. 6A is an illustration showing an example of calculating the optical flow in consecutive frame images and FIG. 6B is an illustration showing an area of measuring a distance to an object after calculating the optical flow;

PREFERRED EMBODIMENTS OF THE INVENTION

Preferred embodiments of the present invention will be described below with reference to embodiments 1 and 2.

(Embodiment 1)

Figure 1:
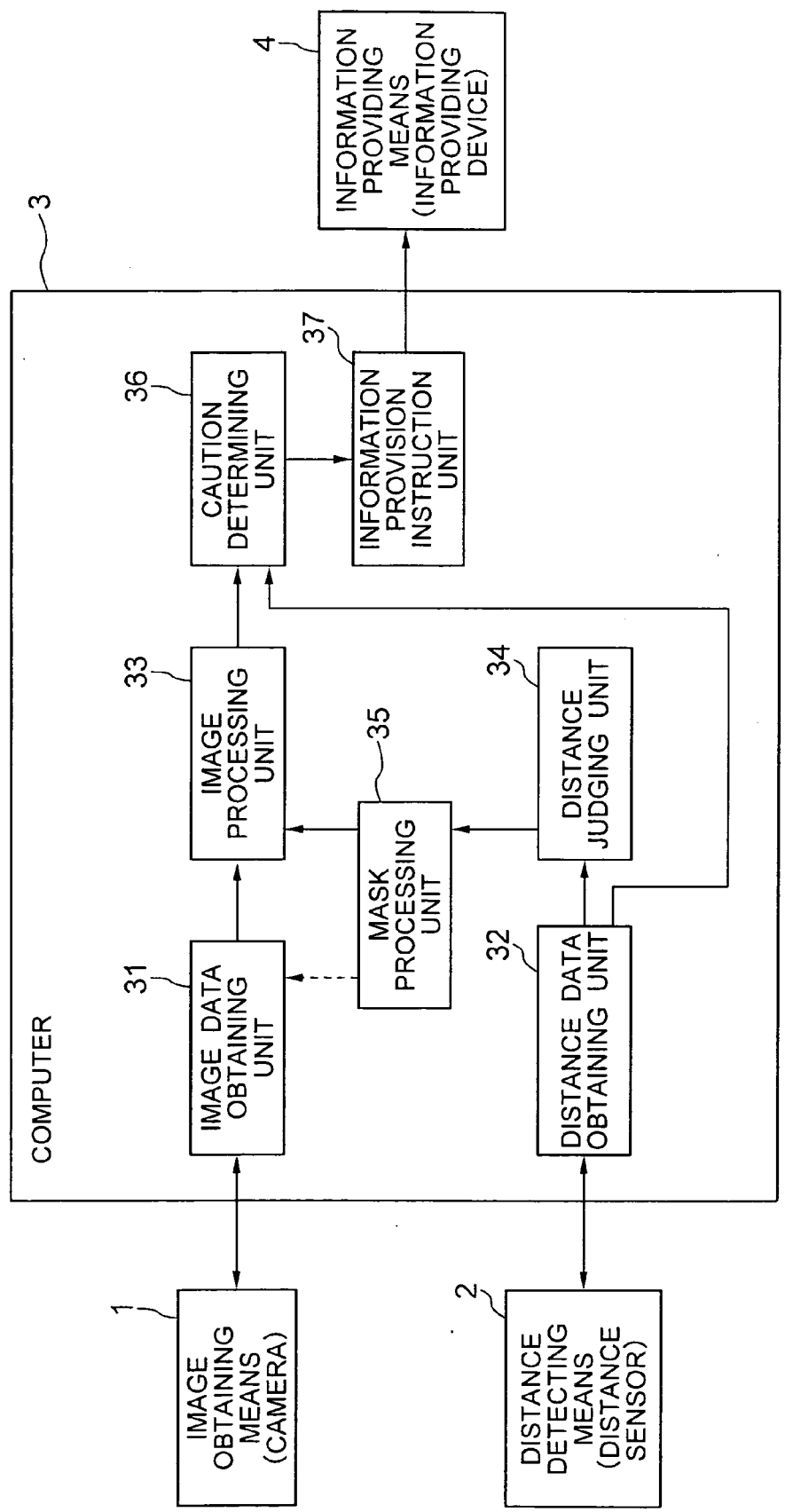
FIG. 1 is a functional block diagram showing the structure of an embodiment 1 of the present invention.
Figure 7:
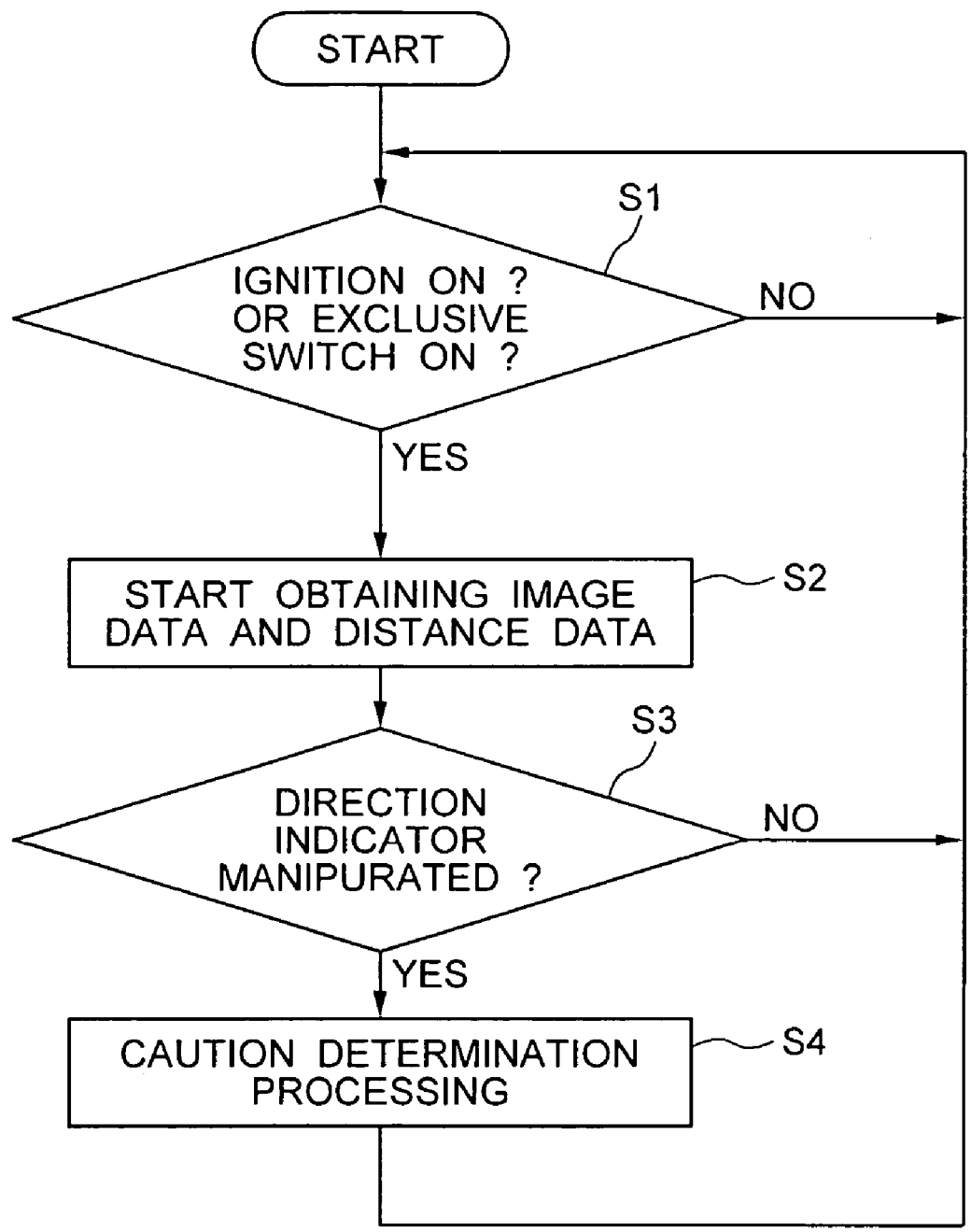
FIG. 7 is a flowchart showing an operation related to a starting operation of a device of the present invention.
Figure 8:
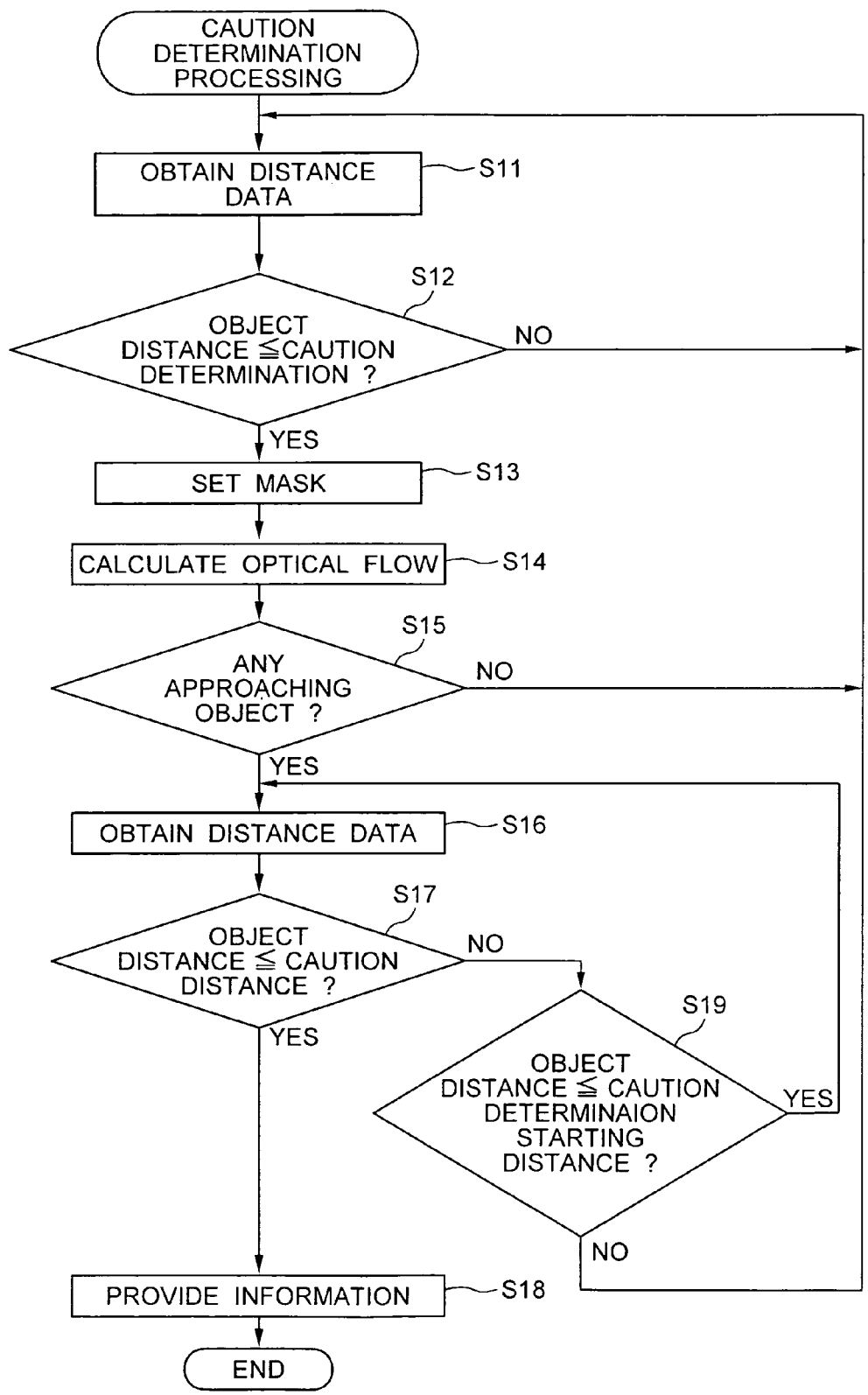
FIG. 8 is a flowchart showing a specific operation of caution-determination processing according to the present device.

An embodiment 1 will be described with reference to FIGS. 1 to 8. FIG. 1 is a block diagram showing the structure of an information providing device for vehicle according to the present invention. FIGS. 2A to 3C are explanatory illustrations showing states of mounting an image obtaining means and a distance detection means. FIG. 4A to 6B are explanatory charts showing states of processing image data and distance data. FIGS. 7 and 8 are flowcharts showing operations of the device.

(Overall Structure)

As shown in FIG. 1, an information providing device for vehicle of the embodiment 1 includes, a camera 1 as an image obtaining means for obtaining image data around the vehicle 10, a distance sensor 2 as a distance detecting means for detecting distance data to an object existing around the vehicle 10, a computer 3 which performs arithmetic processing of the image data and the distance data, and an information providing device as an information providing means for providing information about objects around the vehicle to the occupants of the vehicle, all of which are provided to the vehicle.

The computer 3 is such a device as to perform arithmetic processing of the image data and the distance data to thereby determine whether caution is required against objects around the vehicle, and if caution is required, to provide information through the information providing device 4. The structure will be described below.

(Vehicle)

Figure 2A:
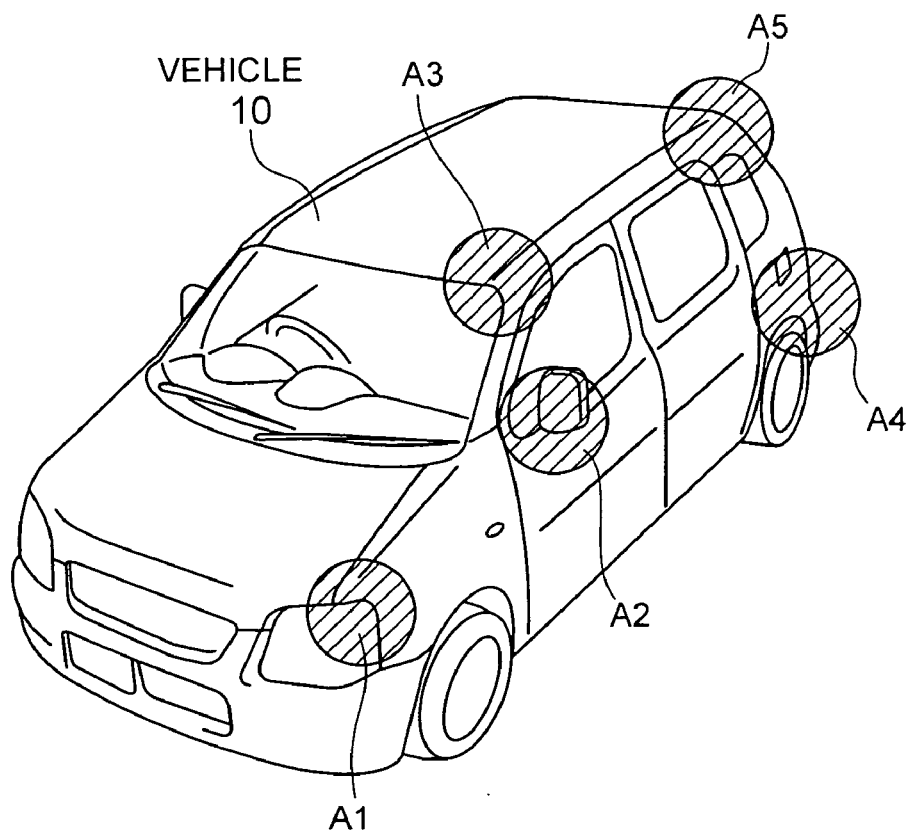

First, the vehicle 10, to which the information providing device for vehicle according to the present invention is provided, is a four-wheel vehicle as shown in FIG. 2A. The camera 1 (image obtaining means) and the distance sensor 2 (distance detection means) are provided on the side of the front part or the rear part of the vehicle 10 as described later. Although FIG. 2A shows an example in which the camera 1 and the like are provided on the left side of the vehicle, the present invention is not limited to this structure. In the present embodiment 1, they are mounted on the right side of the vehicle 10 so as to recognize objects such as other vehicles existing on the right side behind the vehicle, in particular. Note that the vehicle 10 is not strictly limited to a four-wheel vehicle. It may be a heavy vehicle such as a truck having more than six wheels, or may be a vehicle having two or three wheels. Further, a direction in which objects are recognized is not limited to the right side behind the vehicle. It may be the left side behind or the front side.

(Information Providing Means)

The information providing means 4, mounted inside the vehicle 10, is an information providing device 4 for generating sounds to alert the driver in the present embodiment. The operation of the information providing device 4 is controlled by the computer 3 provided to the vehicle 10.

Further, an information providing method by the information providing device 4 includes plural patterns. For example, two patterns of sounds are provided, and a sound of a specific pattern is set to be generated corresponding to the distance to a detected object, as described later. More specifically, a first pattern sound will be generated in a case where the distance to an obstacle is 10 m and it is determined that information should be provided, and a second pattern sound will be generated in a case where the obstacle comes to a 5 m distance. The second pattern sound is bigger in sound than the first pattern sound so as to serve as an alarming sound for further alerting the driver. However, sounds output from the information providing device 4 are not limited to those described above.

The information providing device 4 is not limited to provide information by sounds, but may provide information that caution should be taken against obstacles by a flashing lamp displayed on an instrument panel or the like. Here, the device may be formed by combining the information providing device of sounds as described above, or may be one which alert the driver with other structure. In the case of a displayed alarm, it may be so configured that the flashing patterns change corresponding to the distance to the obstacle.

(Image Obtaining Means)

The image obtaining means 1 is a CCD camera 1 having a wide angle lens in the present embodiment 1, for photographing images within a predetermined range. The camera 1 photographs at every predetermined sampling time, and transmits obtained image data to the computer 3.

Figure 2B:
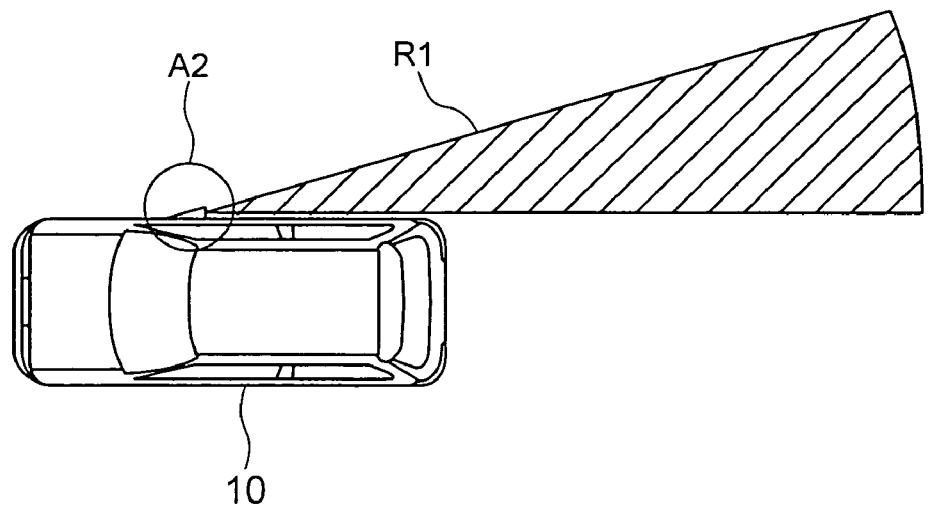

FIGS. 2A and 2B are explanatory illustrations related to the camera 1 and the distance sensor 2 described later. FIG. 2A shows the mounting positions of the camera 1 and the distance sensor 2, and FIG. 2B shows a range measured by them.

First, as shown in FIG. 2A, the camera 1 and the distance sensor 2 may be mounted on the positions indicated by the reference numerals A1 to A5. Although the camera 1 and the distance sensor 2 are so shown as to be mounted on the left side of the vehicle, they may be mounted on the similar positions of the right side. For example, by providing them on a position corresponding to the reference numeral A2 on the right side of the vehicle, that is, a side mirror on the right side of the vehicle, with a backward photographing direction (with the lends facing backwardly), it is possible to set a range on the right side behind the vehicle 10 shown by an approximately sector shape (reference numeral R1) in FIG. 2B as an image obtaining range. Note that the same range is also applied as a distance data detecting range by the distance sensor, as described later. However, the mounting positions of the camera 1 and the distance sensor 2 are not limited to these positions, nor the measuring ranges are not limited to these ranges. The positioning relationship in the state of mounting the camera 1 and the distance sensor 2 on the vehicle will be described later.

Image data obtained by the camera 1 is obtained as, for example, black and white images having 256 gradations in one pixel, which is photographed as one image (frame) at a time. When plural frames are photographed, they are classified in such a manner that consecutive frames can be identified, and are saved temporarily in the computer 3. Here, the image obtaining means is not limited to the CCD camera 1, and may be one capable of obtaining images.

The image obtaining operation of the camera 1 is controlled by the computer 3 as described later. In other words, image data is obtained and the obtained image data is transmitted to the computer 3, based on instructions from the computer. For example, image data is set to be obtained together with distance data at a predetermined time interval.

(Distance Detecting Means)

An obstacle detecting means 2 is a distance sensor 2, which detects obstacles existing outside the vehicle 10 and detects the direction and the distance which are data related to the positions of the obstacles. More specifically, the distance sensor 2 consists of a laser radar. Here, a laser radar means one which emits a near-infrared laser beam to an object detection range and receives a light reflected at the obstacle and returned, whereby measures the distance to the object based on the time difference. The operation of the distance sensor 2, which is a laser radar, is controlled by the computer 3, and obtainment of the distance data is performed by the computer 3, as described later.

Although a laser radar is explained as the distance sensor 2 in the above description, the distance sensor 2 is not limited to this. The distance sensor 2 may be one which can detect the position of an obstacle, such as a millimeter wave radar, a scan-type photoelectric tube, a scan-type ultrasonic sensor, a range finder capable of detecting image and distance at the same time, or the like. Further, it may be one capable of not only obtaining two-dimensional distance information but also three-dimensional distance information.

In the present embodiment, the distance sensor 2 is mounted on a position almost the same as that of the camera 1. For example, in a case where the distance sensor 2 is provided to a side mirror as shown in FIG. 2B, it is possible to obtain distance data of a range Ri shown as a sector form on the right side behind the vehicle 10. Specifically, by the distance sensor 2, a laser is emitted so as to scan a certain range at every predetermined angle in a backward direction along the side face of the vehicle 10. Then, by the sensor 2, two-dimensional distance data of an obstacle existing within the range is obtained. In other words, by setting a backward direction along the side face of the vehicle as 0 degree, the angle q between the side face and the emitted laser and the distance L to the object existing on the angle q are measured. Then, the measured angle and the distance data are output to the computer 3 described later, whereby the computer 3 can obtain the distance L to the obstacle and the angle q at that time from the data number, and can generate a distance distribution.

Figure 3C:
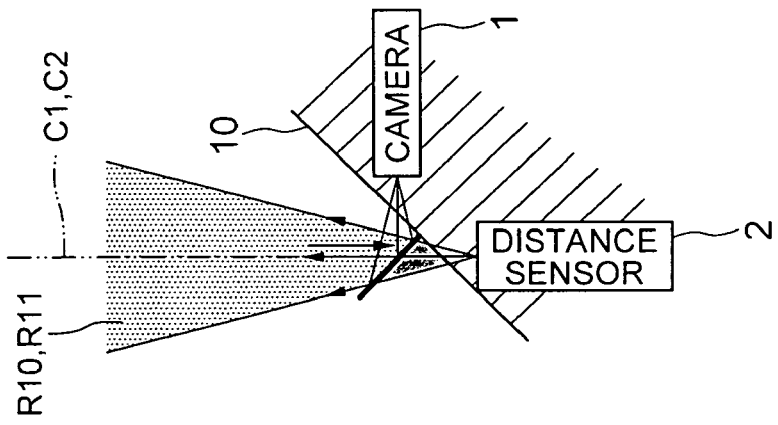

Here, mounting positions of the camera 1 and the distance sensor 2 will be explained with reference to FIGS. 3A to 3C. First, as shown in FIG. 3A, the distance sensor 2 is provided in the vehicle 10 while being arranged in such a manner that the distance data detecting direction naturally faces the outside of the vehicle. Then, a half mirror 11 which transmits the laser from the distance sensor 2 in a distance data detecting direction of the distance sensor 2 is provided to the vehicle 10. The half mirror 11 transmits a laser output from the distance sensor 2 in an outward direction of the vehicle, and also transmits the laser reflected at an object existing outside the vehicle so as to return from the outside of the vehicle to the distance sensor 2 (see arrow Y1). Thereby, a detection rage of the distance data by the distance sensor 2 is set as shown by the shaded range R11 in FIG. 3A. Here, the reference axis for detecting distance positioned at the center of the distance data detection range is shown by the reference numeral C2.

Figure 3B:
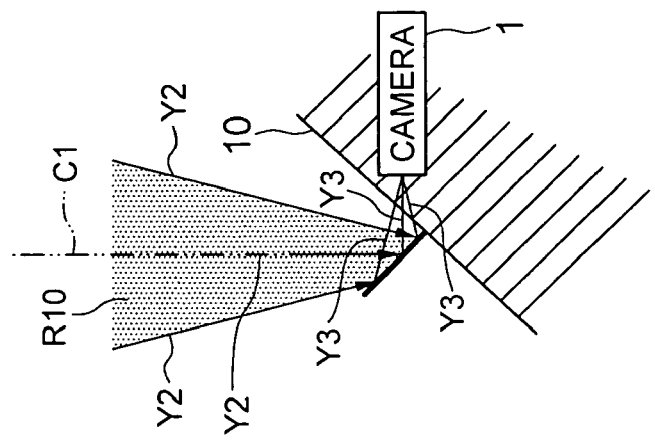
Figure 3A:
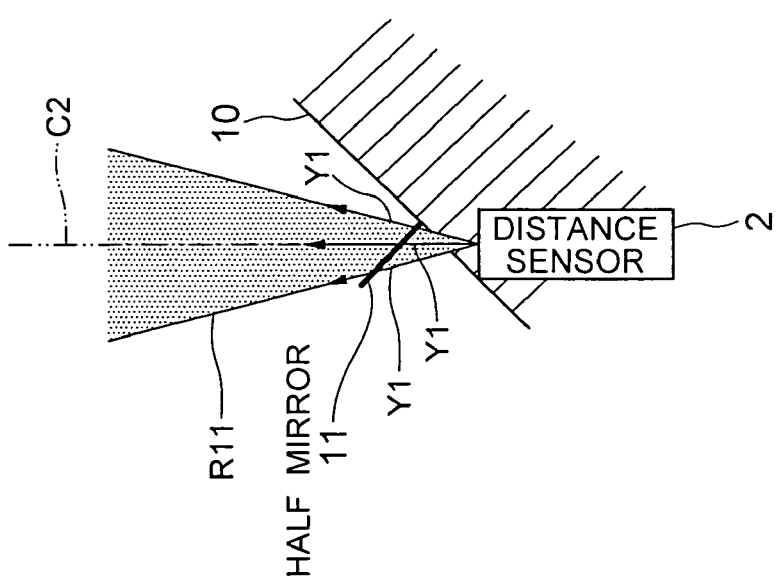
Figure 5:
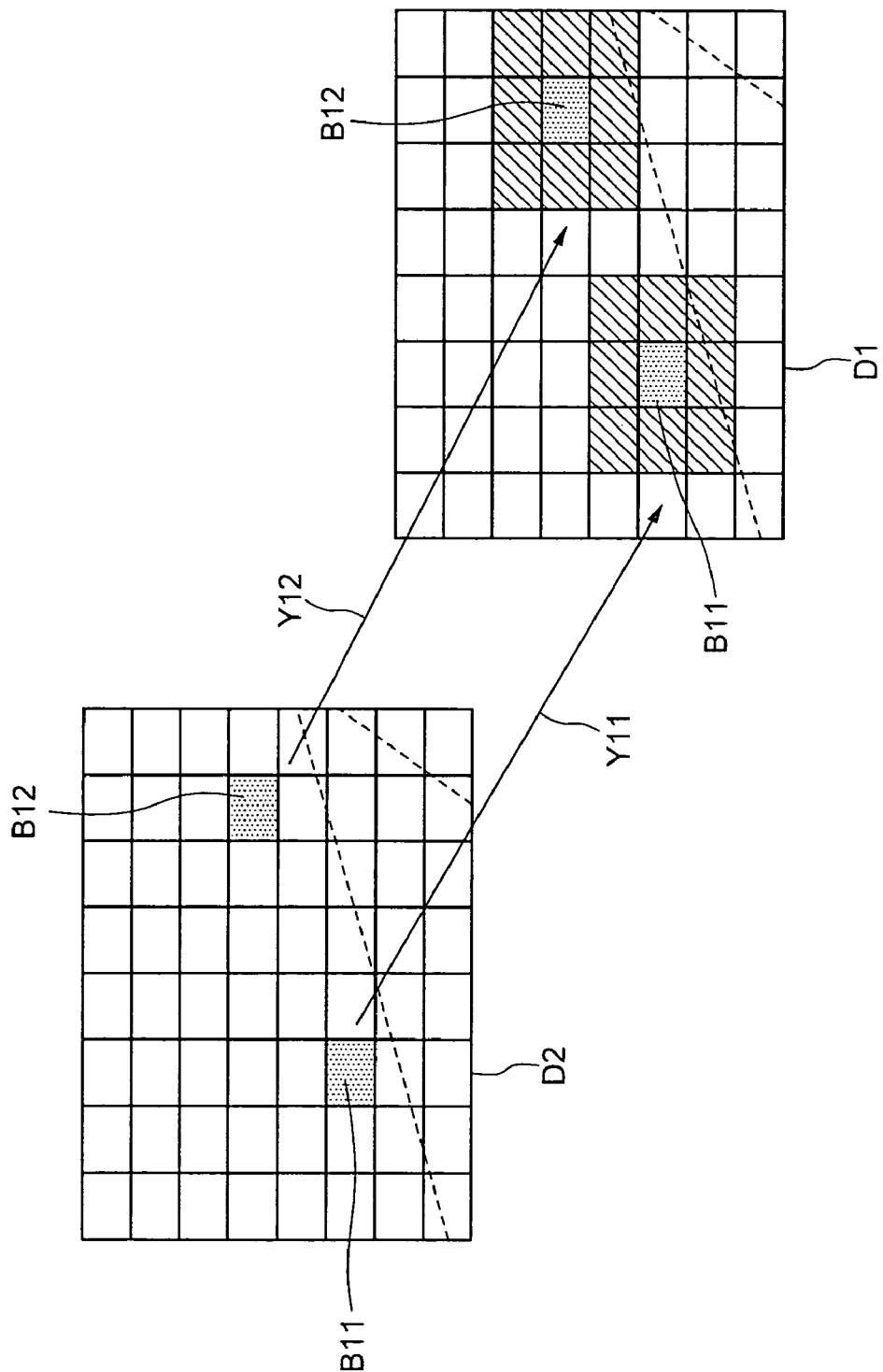
FIG. 5 is an explanatory chart showing an example of setting optical flow calculation areas.

On the other hand, the camera 1 is provided at a position different from the distance sensor 2 as shown in FIG. 3B. The camera 1 is arranged in such a manner that an image obtaining direction by the camera 1 is set toward a surface, facing the outer side of the vehicle 10, of the half mirror 11. Thereby, images in the predetermined range R10 outside the vehicle are reflected at the half mirror 11 and obtained by the camera 1 (see arrows Y2 and Y3). The reference axis for obtaining images positioned at the center of the image data obtaining range is shown by the reference numeral C1.

FIG. 3C shows the structure in which the camera 1 and the distance sensor 2 are combined. As shown in FIG. 3C, the camera 1 and the distance sensor 2 are mounted on the mounting positions which are arranged in such a manner that the image data obtaining range R10 of the camera 1 and the distance data detection range R11 of the distance sensor 2 almost coincide with each other.

Here, in particular in the present invention, the mounting positions of the camera 1 and the distance sensor 2 are arranged in such a manner that the reference axes serving as the centers of respective data obtaining ranges of the camera 1 and the distance sensor 2, that is, the reference axis for obtaining information C1 and the reference axis for detecting distance C2 are aligned coaxially. Thereby, the centers of respective data obtaining ranges coincide with each other, so that it is possible to prevent false detections when detecting objects to be alerted based on the data, as described later. Further, by obtaining the image data and the distance data in the same scale, each data can be obtained within the completely same range, whereby positional deviations can be prevented.

(Computer)

The computer 3, provided inside the vehicle 10, is a typical computer including a CPU as an operating means and memories such as a ROM and a RAM as storing means. The computer 3 is connected with the camera 1, the distance sensor 2 and the information providing device 4, and controls the operations thereof.

Here, explanations will be given for each function of the computer 3. Note that each function is realized in such a manner that a predetermined program is installed in the CPU, whereby each processing unit operable as each function is established in the CPU. Programs to be incorporated in the CPU may be stored beforehand in a memory in the computer 3 and is read out at the time of execution, or may be stored in another storing medium and the program data is transferred and provided to a memory.

In the processing units established in the CPU of the computer 3 include an image data obtaining unit 31 and a distance data obtaining unit 32, as shown in FIG. 1. These processing units 31, 32 control the operations of the camera 1 and the distance sensor 2, and obtain image data from the camera 1 and distance data from the distance sensor 2. In other words, a data obtaining function is realized. In particular, the data obtaining function is set to constantly obtain image data and distance data at a predetermined time interval when the information providing device for vehicle according to the present invention operates. Both data are obtained at the same time. However, the data obtaining function by the image data obtaining unit 31 and the distance data obtaining unit 32 is not limited to obtaining each data as described above. Each of them may operate to obtain each data separately at a predetermined timing.

Further, in the CPU, an image processing unit 33, a distance judging unit 34, a mask processing unit 35, and a caution determination unit 36 are established. With the operation of each of the processing units 33, 34, 35, 36 and each of the aforementioned data obtaining units 31, 32, image data and the distance data are arithmetically processed in the computer, whereby a caution-requirement determining function for determining whether caution is required against objects existing around the vehicle is realized. Further, in the CPU, an information-provision instruction unit 37 is established, whereby when it is determined caution is required, an information providing function to output an instruction to provide information by the information providing device 4 to the occupants of the vehicle is realized.

Figures 4A, 4B:
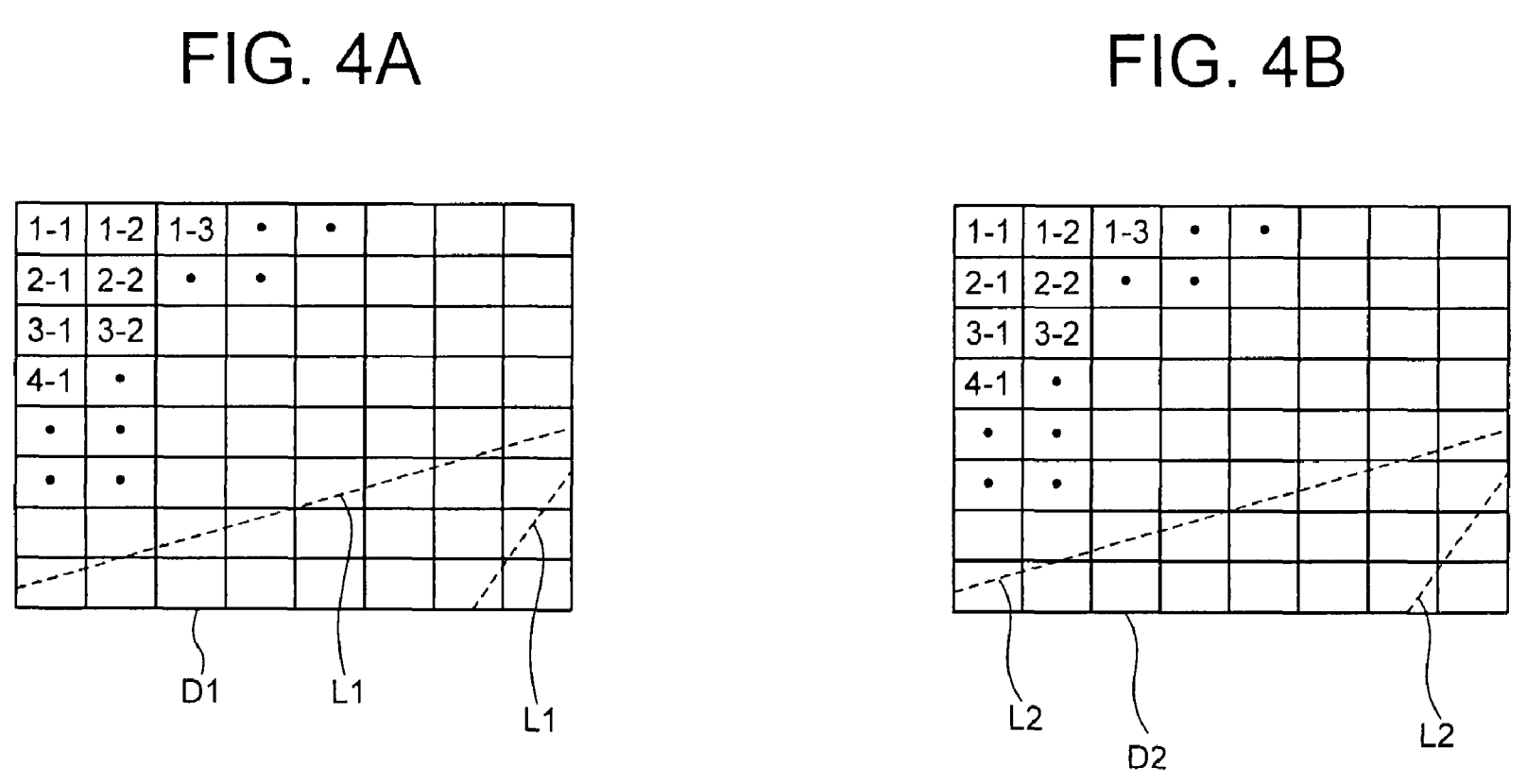

Here, each of the image data and the distance data processed in the computer is set to be divided in plural areas. That is, each data are dividedly set in the computer 3, and each area of each data is set to have a corresponding relationship of one to one. Such a state is shown in FIGS. 4A and 4B. FIG. 4A shows a divided state of the image data D1, and FIG. 4B shows a divided state of the distance data D2. As shown in these Figs., each area number 1-1, 1-2, 1-3 or the like is set from the left top position in a horizontal direction, and also each number 1-1, 2-1, 3-1 or the like is set in a vertical direction. In the same area number, it is assumed to detect a same range outside the vehicle. More specifically, in the divided areas near the centers of the image data and the distance data, the reference axes C1 and C2 of the camera 1 and the distance sensor 2 coincide with each other, whereby it is natural that image data and distance data of the same place are obtained. By setting the obtaining area of each data to the same range, it is possible to correspond divided areas of each data one to one, as described above. Note that the dotted lines shown by the reference numerals L1, L2 in the FIGS. 4A and 4B indicate the driving lane of a road where the vehicle 10 is traveling. Assuming that the image data and the distance data are obtained almost at the same time, these lines almost coincide with each other.

Further, the image processing unit 33, the distance judging unit 34, the caution determination unit 36 and the like working as the caution-requirement determining function also include a function to perform processing to predetermined divided areas. That is, it is possible not to perform processing to all of the data obtaining ranges for recognizing objects against which caution should be taken, but to perform object recognition processing with a limitation to a predetermined divided areas. This will be described later.

An explanation will be given for each processing unit more specifically. First, the distance judging unit 34 obtains, through the data obtaining unit 32, distance data obtained by the distance sensor 2, and checks whether objects exist within a predetermined distance in the distance data. For example, a predetermined distance (hereinafter also referred to as a caution-determination starting distance) is set through experimentations or the like, and is stored in the memory of the computer 3. The distance is, for example, 20 m. When it is determined that an object exists within the distance, a divided area number in which the obstacle exists is specified, and is output to the mask processing unit 35.

The mask processing unit 35 notifies the divided area number to the image processing unit 33. The mask processing unit 35 may notify the divided number to the image data obtaining unit 31 (see the dotted line in FIG. 1). Such processing will be described later as a modified example.

Then the image processing unit 33 obtains image data form the camera 1 obtained by the image data obtaining unit 31 at the same time as the distance data, and calculates the optical flow in the image data. Here, in the memory (not shown) of the computer 3, there is stored image data obtained before and after in time to the image data currently obtained, and using such data, processing to calculate the optical flow is performed. Here, the optical flow calculation processing is performed to the divided area on the image data corresponding to the divided area number notified from the mask processing unit 35. Here, a further description will be given with reference to FIG. 5. The optical flow calculation ranges are, divided areas on the image data D1 corresponding to the areas B11, B12 on the distance data D2, which are recognized that an object exists within the caution-determination starting distance (see arrows Y11, Y12), and the peripheral areas B1, B2 around the areas B11, B12 (see the fill areas shown as B11, B12 and the shaded areas around them). Note that the optical flow calculation range is not limited to those shown in FIGS. 5.

Figure 6A:
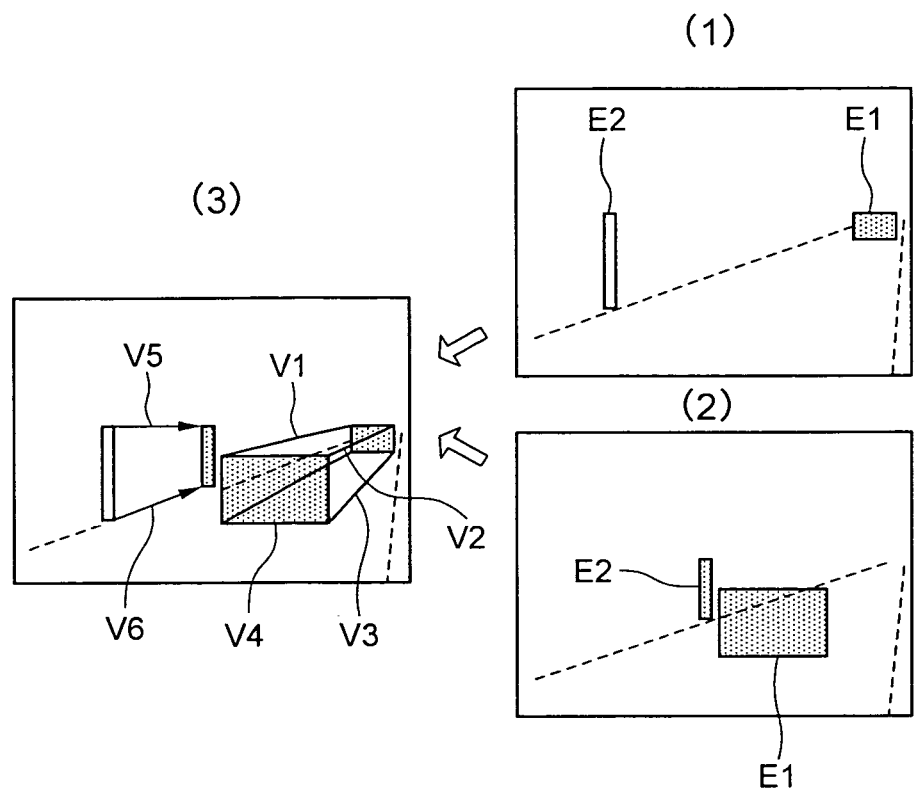
Figure 6B:
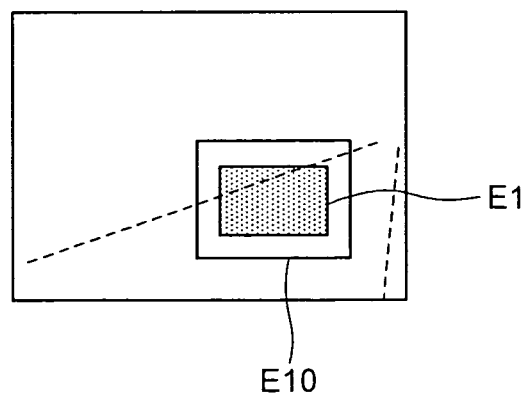

FIGS. 6(A) and 6(B) show an example of the optical flow calculation processing performed by the image processing unit 33. First, FIGS. 6(A)(1) and 6(A)(2) show frame images obtained consecutively in time. It is assumed that two objects E1 and E2 exist in those images. When calculating the optical flow from these consecutive frame images, the optical flow shown by the arrows V1 through V6 in FIG. 6A(3) can be obtained. Here, an optical flow means motion vectors of characteristic points of the photographed image. By calculating the optical flow, it is possible to recognize the traveling direction and the speed of the objects relatively moving with reference to the vehicle 10. More specifically, the optical flows can be calculated by extracting the same characteristic points on the consecutive frames.

Then, from the optical flow V1 to V6, objects approaching the own vehicle 10 are detected. In the example shown in FIG. 6A, an object E1, the optical flow of which is moving towards the own vehicle, is recognized as an approaching object. Then, a divided area on the imaged data where the object E1 exists is specified and the peripheral area is also specified, an example of which is shown by the reference numeral E10 in FIG. 6B. Then, information related to such a divided area is notified to the caution determination unit 36.

The caution determination unit 36 determines whether caution is required against the object existing in the divided area E10. Here, distance data detected constantly by the distance sensor 2 at every predetermined time interval is obtained through the distance data obtaining unit 32. Then, the distance to the object E1 within the divided area E10 is measured, and if the object E1 exists in a range of the predetermined distance where caution is required (hereinafter also referred to as a caution distance), the caution determination unit 36 determines that caution is required against the object E1, and notifies the fact to the information provision instruction unit 37.

Then, upon receipt of the notification, the information provision instruction unit 37 instructs the information providing device 4 to output an information provision. Thereby, an information provision with a sound alerting the driver or the like is output from the information providing device 4.

(Operation)

Next, the operation of the present embodiment will be described with reference to flowcharts in FIGS. 7 and 8. FIG. 7 shows an operation related to the starting operation of the present device, and FIG. 8 shows a specific operation for processing a caution determination by the present device.

First, in the computer 3 of the vehicle 10, it is checked whether the ignition of the vehicle 10 turned on or a switch exclusive for the present device turned on (the step S1). If either one of them turns on (positive determination in the step S1), obtaining operation of image data and distance data starts (the step S2). In other words, the device is in the active state, and in a state of constantly monitoring the right side behind the vehicle 10.

Then, in the computer 3, the direction indicator of the vehicle 10 is checked whether it is manipulated (the step S3). If the direction indicator is manipulated during driving or at the time of starting (positive determination in the step S3), caution determination processing starts (the step S4). This is because caution is required against other vehicles approaching from behind, when changing the lane.

FIG. 8 shows the detailed operation of caution determination processing. First, using the distance data detected right before (the step S11), the distance to the detected object is checked whether it is within the predetermined distance to start a caution determination (the step S12). If it is within such a distance, a divided area on the distance data where the object exists is searched, and a divided area on the image data corresponding to such a divided area is specified (the step S13). Then, in the divided area on the detected image data, the optical flow of the object existing within the area is calculated (the step S14). The image data used here is the latest, consecutive frame images which are continuously loaded at constant.

Next, from the optical flow calculated, the object is determined whether it is approaching the vehicle 10 (the step S15). If the object exists (positive determination in the step S15), the current distance data is obtained (the step S16). Then, in a divided area on the distance data which area has a larger range than the divided area on the image data where the approaching object exists, it is determined whether the distance to the object is within the predetermined caution distance to which the occupants of the vehicle must take caution (the step S17). When the object distance is less than the caution distance (positive determination in the step S17), an instruction is output to generate an information provision to the information providing device 4 (the step S18). Then, an alarming sound is generated in the vehicle from the information providing device 4, whereby the occupants can take caution against another vehicle approaching from the side behind the vehicle.

In the step S17, the distance to the object may be measured more specifically. For example, as for the caution distance described above, two values (a first caution distance and a second caution distance) are set, one of which is 10 m and the other is 5 m. When the object is determined to exist within the first caution distance (10 m), an instruction is output to the information providing device 4 to generate an alarming sound for urging a normal caution. On the other hand, when the object is determined to exist within the second caution distance (5 m), an instruction is output to the information providing device 4 to generate an alarming sound with a bigger volume for urging the driver to take further caution. Then, the information providing device 4 outputs an alarming sound corresponding to each instruction.

Further, after the approaching object is detected (positive determination in the step S15 and in the step S17), if the distance to the object is less than the caution distance (negative determination in the step S17), the distance to the object is checked whether it is less than the caution-determination starting distance (the step S19). If it is less than the caution-determination starting distance (positive determination in the step S19), the distance data is again obtained, and the distance to the object is checked whether it is less than the caution distance (the steps S16, S17). If a negative determination is done in the step S19, return to the step S11.

During the aforementioned operation, the computer 10 always monitors the state of the direction indicator, and if it turns to the state not being operated, the computer 10 ends the caution determination processing.

In this way, since the camera 1 and the distance sensor 2 detect image data and distance data around the vehicle while being aligned coaxially, the detection ranges of respective data detected coincide with each other with high accuracy. Accordingly, the result of determining whether caution is required against the objects around the vehicle, performed based on such data, can be obtained with high accuracy, and more reliable information can be obtained.

Further, in both of the image data and the distance data, it is determined whether an object against which caution is required exists or not in the predetermined areas corresponding with each other, whereby the processing range can be limited and the burden of the processing can be reduced. Moreover, by determining whether objects exist within the range of a predetermined distance using the distance data, and if exists, determining whether objects against which caution is required exit using the image data of such a range, the burden of the processing can be further reduced.

MODIFIED EXAMPLE 1

In the aforementioned embodiment 1, first it is checked using the distance data whether objects exist within the range of the caution-determination starting distance (the step S12), then checked using the image data whether the objects are approaching (the step S15), and then checked whether the approaching objects exist within the caution distance using the distance data (the step S17), thereby to determine whether caution is required against the objects. However, processing to determine the caution requirement is not limited to the aforementioned processing.

For example, in the step S12, at the point when an object existing within the range of the caution-determination starting distance is detected from the distance data, then the optical flow is calculated from the image data, and then it is determined that the object is approaching (positive determination in the step S15), an instruction to provide information may be output to the information providing device 4 by determining that caution is required against the object. Further, the processing to determine the caution requirement may be done in another procedure.

MODIFIED EXAMPLE 2

The aforementioned embodiment 1 has such a structure that divided areas are set in the computer 3 for image data and distance data obtained by the camera 1 and the distance sensor 2, and predetermined processing is performed for each divided area when required. However, the present invention is not limited to this structure.

For example, the computer 3 naturally has an area dividing function for dividing image data and distance data so as to have multiple areas and setting these divided areas by making them correspond with each other. In addition, the computer 3 may also have a divided data loading function with which the operations of the image obtaining means and the distance detection means are so controlled that the image data and the distance data can be obtained for each divided area, and the divided areas are so set that the divided areas correspond with each other. In other words, the image data obtaining unit 31 and the distance data obtaining unit 32 may be operated as the divided data loading function in such a manner as not only to obtain the image data or the distance data of the whole range at once, but also, in some cases, to obtain the image data or the distance data of only a predetermined divided area.

An explanation will be given more specifically with reference to the block diagram in FIG. 1 and the flowchart in FIG. 8. First, the aforementioned distance judging unit 34 determines whether objects exist within the range of a predetermined distance (caution-determination starting distance), and if objects exist within the predetermined distant range, divided areas on the distance data where the objects exist are specified. Here, the specified divided areas are notified by the mask processing unit 35 to the image data obtaining unit 31 (see the dotted line from the mask processing unit 35 to the image data obtaining unit 31 in FIG. 1). In other words, the distance judging unit 34 and the mask processing unit 35 have a load area specifying function with which divided areas on the image data are specified and notified to the divided data obtaining function which is the image data obtaining unit 31. Then, in the image data obtaining unit 31, upon receipt thereof, the divided data obtaining function is activated, whereby only image data in the divided areas designated is obtained. Note that the distance judging unit 34 may specify divided areas for obtaining data including the periphery of the areas where the objects exist within the predetermined distance. Alternatively, the divided data loading function of the image data obtaining unit 31 may be so operated as to load the specified peripheral area as well.

Then, using the image data in the divided areas obtained, processing to determine whether caution, such as processing to calculate the optical flow, is required is performed. Accordingly, at the time of processing in the steps S14 and S15 in FIG. 8, the image data of the areas specified by the mask setting in the step S13 is obtained at every predetermined sampling time constantly. Using this data, processing to calculate the optical flow is performed.

In this way, it is also possible to reduce the burden on the computer 3 at the time of obtaining image data. In particular, calculation of the optical flow requires consecutive frame images. Therefore, it is possible to save the memory area for storing such data.

(Embodiment 2)

An embodiment 2 of the present invention will be described below. An information providing device according to the present embodiment has the structure which is almost same as that of the device described in the aforementioned embodiment 1. More specifically, the hard structure is same. That is, the points that a camera 1 working as an image obtaining means and a distance sensor 2 working as a distance detection means are so mounted that the reference axes coincide with each other, and divided areas of the image data and distance data obtained are set so as to correspond one to one, are same. However, the processing contents in respective processing units established in the computer 3 are different, which will be described in detail below.

The information providing device for vehicle according to the present embodiment first determines, with a function of determining caution requirement, whether objects approaching the vehicle exist using the divided image data, and also determines whether objects against which caution is required exist in the divided areas of the distance data corresponding to the areas in which the approaching objects exist. That is, in the present embodiment, first the optical flow within the range of the image is calculated using the image data, and then it is checked whether objects approaching the own vehicle 10 exist. When it is determined that approaching objects exist, mask processing is performed so as to measure the distance to the objects existing within the divided areas on the distance data corresponding to the divided areas where the objects exist, and it is checked whether the objects exist within the caution distance.

For example, given an explanation comparing with the flowchart in FIG. 8, processing from the step S11 to the step S13 is not performed, but processing to calculate the optical flow in the whole area of the image data is performed first (the step S14). Then, if it is determined there are approaching objects (positive determination in the step S15), distance data having been obtained is read out, or current distance data is obtained and mask processing of divided areas where the approaching objects exist is performed as well, to thereby check whether the objects in the distance data exist within the range of the caution distance (the steps S16, S17). In this way, it is also possible to reduce the processing burden on the computer since the processing areas are limited.

MODIFIED EXAMPLE

As a modified example of the aforementioned embodiment 2, the device may be so configured to obtain distance data of the divided areas which are determined that approaching objects exist therein. In other words, the optical flow is calculated using image data and then divided areas within which the approaching object exist are specified. Mask processing may be performed at the point where the specified areas are notified to the distance data obtaining unit 32 and the distance data is obtained. Thereby, it is possible to reduce data amount to be obtained and processed, which leads to a reduction of the burden caused by the obtaining processing on the computer 3.

INDUSTRIAL APPLICABILITY

According to the present invention which is configured and works as described above, since the image obtaining means and the distance detecting means, aligned coaxially, detect image data and distance data around the vehicle, the detection ranges of the data coincide with each other with high accuracy. Thereby, the result of determining, based on the data, whether caution is required against objects around the vehicle can be obtained with high accuracy, so that it is possible to provide more reliable information. In other words, frequent occurrence of false alarms (information provision) can be suppressed, thereby the occupants of the vehicle can be released from annoyance caused by false alarms.

Further, for both of image data and distance data, it is determined whether objects against which caution is required exist in a predetermined area where both of the data correspond with each other. Therefore, the processing range is limited, whereby the processing burden can be reduced.

In particular, the processing burden can be further reduced by determining whether objects exist within a range of a predetermined distance using distance data, and if exist, determining whether the objects against which caution is required exist using the image data of the corresponding area. In contrast, it is also possible to reduce the processing burden as same as described above in such a manner as to determine using image data whether approaching objects exist, and if exist, to determine using distance data of the corresponding areas whether objects against which caution is required exist using. Here, if the device is so configured as to obtain data of only divided areas for which processing is performed, the burden on the computer in data obtaining can be further reduced.

What is claimed is:

1. An information providing device for a vehicle, comprising:
   an image obtainer that obtains image data around a vehicle;
   a distance detector that detects distance data to an object existing around the vehicle;
   a computer which controls an operation to obtain the image data by the image obtainer and an operation to obtain the distance data by the distance detector, and performs arithmetic processing of the image data and the distance data; and
   an information provider that provides information about an object around the vehicle, the image obtainer, the distance detector, the computer, and the information provider being provided to the vehicle, wherein
   the computer comprises:
      an area dividing function that divides the image data obtained by the image obtainer and the distance data detected by the distance detector into a plurality of areas, respectively, and sets divided areas to correspond with each other;
      a caution-requirement determining function that determines, by performing the arithmetic processing of the image data and the distance data, whether caution is required with respect to an object existing around the vehicle, the caution-requirement determining function having a function of performing processing of data in a predetermined divided area, determining, using the divided distance data, whether an object exists within a predetermined distance range from the vehicle, and determining whether an object against which caution is required exists in a divided area of the image data corresponding to an area where the object exists within the range of the predetermined distance; and
      an information providing function that outputs an instruction so as to provide information by the information provider to the occupants of the vehicle if it is determined that caution is required,
   a reference axis associated with obtaining an image is positioned at a center of a range for obtaining image data by the image obtainer, while a reference axis associated with detecting a distance is positioned at a center of a range for detecting distance data by the distance detector, and
   the image obtainer and the distance detector are arranged such that the reference axis associated with obtaining an image and the reference axis associated with detecting a distance are aligned coaxially.

2. The information providing device for a vehicle according to claim 1, wherein the caution-requirement determining function includes a function of determining, using the image data divided, whether an object approaching the vehicle exists, and determining whether an object against which caution is required exists in a divided area of the distance data corresponding to an area where the approaching object exists.

3. The information providing device for a vehicle according to claim 1, wherein the computer comprises:

an area dividing function that divides the image data obtained by the image obtainer and the distance data detected by the distance detector into a plurality of areas, respectively, and sets divided areas to correspond with each other; and a divided data loading function that controls operations of the image obtainer and the distance detector to obtain the image data and the distance data for each of the divided areas, and sets divided areas to correspond with each other, and the caution-requirement determining function has a function of performing processing of data in a predetermined divided area.

4. The information providing device for a vehicle according to claim 3, wherein the caution-requirement determining function includes:

a load area specifying function that determines, using the distance data, whether an object exists within a range of a predetermined distance from the vehicle, and if an object exists within the range of the predetermined distance, that specifies a divided area on the image data corresponding to a divided area on the distance data where the object exists and specifies the divided data loading function; and a function of determining, using data of the specified divided area obtained by the divided data loading function, whether an object against which caution is required exists, and the divided data loading function includes a function of obtaining, by the image obtainer, the image data of the divided area specified, based on a notification from the load area specifying function.

5. The information providing device for a vehicle according to claim 3, wherein the caution-requirement determining function includes:

a load area specifying function that determines, using the image data, whether an object approaching the vehicle exists, and if the approaching object exists, that specifies a divided area on the distance data corresponding to a divided area on the image data where the object exists, and notifies the divided data loading function; and a function of determining, using the distance data of the specified divided area obtained by the divided data loading function, whether an object against which caution is required exists, and the divided data loading function includes a function of detecting by the distance detector the distance data of the divided area specified, based on a notification from the divided area specifying function.

6. The information providing device for a vehicle according to claim 1, wherein the distance detector determines whether a detected object is within a predetermined distance to the vehicle, and outputs a position identifier identifying a position of the detected object, and the computer selects image data corresponding to the position identifier and performs optical flow processing on only the selected image data to determine whether the detected object is approaching the vehicle.

7. The information providing device for a vehicle according to claim 1, further comprising a half mirror which aligns the reference axis associated with obtaining an image with the reference axis associated with detecting a distance.

* * * * *